Sept. 6, 1960          R. B. SAALFRANK          2,951,446

STROKE-ADJUSTING MECHANISM

Filed April 16, 1956          3 Sheets-Sheet 2

Sept. 6, 1960  R. B. SAALFRANK  2,951,446
STROKE-ADJUSTING MECHANISM
Filed April 16, 1956  3 Sheets-Sheet 3

United States Patent Office 2,951,446
Patented Sept. 6, 1960

2,951,446

STROKE-ADJUSTING MECHANISM

Royal Bartlett Saalfrank, Gulfport, Fla., assignor to Milton Roy Company, Philadelphia, Pa., a corporation of Pennsylvania Filed Apr. 16, 1956, Ser. No. 578,502

16 Claims. (Cl. 103—38)

This invention relates to variable stroke driving mechanisms, more particularly to controlled volume pumps in which it is desired to vary the length of the stroke to suit the changing requirements of particular applications.

Heretofore, variable stroke driving mechanisms have been provided with a movable stroke-adjusting element by means of which the length of the stroke may be varied from zero to a specified maximum. Some stroke-adjusting means may be operated during operation of the driving mechanism or pump. In general such stroke-adjusting means have included provisions for resisting the reaction forces developed during the working stroke of the mechanism. Some mechanisms have utilized worm wheel drives to minimize unwanted movement of the stroke-adjusting element. Even with the worm and worm wheel adjusting means, the reaction forces may be of such magnitude as to cause unwanted movement of the stroke-adjusting element to vary the length of stroke. Some stroke-adjusting means include locking means and the like which hold the stroke-adjusting element in a fixed position. To change the length of stroke, the locking means such as a lock-nut on the worm wheel shaft must be loosened.

A part of the concept underlying the present invention represents a departure from the concept of moving the stroke-adjusting element through driving elements which inherently tend to absorb the reaction forces by introduction of substantial friction. Such devices require substantial effort not only to overcome the friction but also to overcome the large reaction forces applied to the stroke-adjusting element during the working part of each stroke.

In accordance with the present invention, the stroke-adjusting element during the non-pressure-producing return stroke is relatively unrestrained, is relatively free of reaction forces of any kind, and can be moved from one stroke-determining position to another with a minimum of effort. The stroke-adjusting element has a restraining means actuated in timed relation with the driving means for holding it against any stroke-adjusting movement during the pressure-producing working stroke. The present invention is characterized by the fact that the movable stroke-adjusting element is by a restraining means held in a fixed stroke-adjusting position during each pressure-producing working stroke but is released for stroke-adjusting movements only during the non-pressure-producing return strokes. Though the invention is useful when applied to manual arrangements for adjustment of the stroke length, it is particularly well suited to automatic adjustment of the stroke length to suit changing needs of the process to which the stroke-adjusting mechanism is applied.

In accordance with further aspects of the invention, the stroke-adjusting means derives its power from the driving motor for the reciprocating mechanism and yet has a sensitive element which may be made extremely light for high sensitivity and thus may be operable directly by condition-responsive devices.

In carrying out the invention in one form thereof, a condition-responsive element is arranged to position a sensing element on one side or the other of a neutral position for adjustment of the stroke length in one direction or the other. The change in stroke length will be proportional to the distance the sensing element is moved from its neutral position. After the initial positioning, the sensing element is clamped in fixed position and associated elements having their own source of power, as for example from the driving motor, then cooperate to move the stroke-adjusting element in a direction and to an extent related to the direction and extent of movement of the sensing element from is neutral position. The foregoing operations take place in timed relation with the stroke driving mechanism so that the stroke-adjusting element is moved only during the non-working return stroke.

For further objects and advantages of the invention and for an understanding of several embodiments thereof, reference is to be had to the following description taken in conjunction with the accompanying drawings, in which:

Fig. 1 diagrammatically illustrates one embodiment of the invention;

Figure 1:
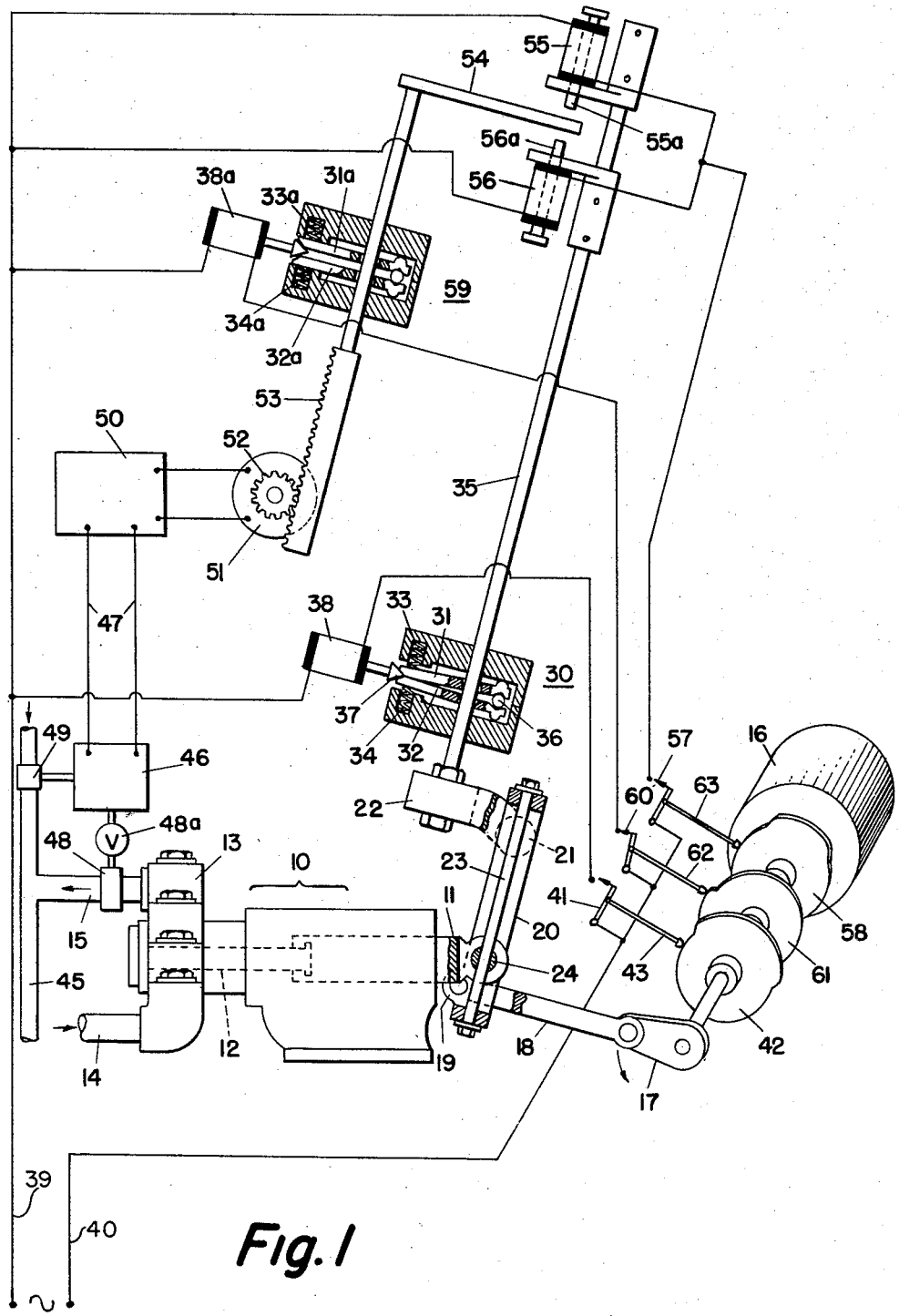

Referring now to Fig. 1, the invention in one form has been illustrated as applied to a controlled volume pump 10 which includes a crosshead 11 driving a plunger 12 to and fro within a plunger chamber provided within a step valve assembly 13. Liquid under a net positive pressure flows through an inlet line 14 and passes into the plunger chamber by way of a pair of inlet ball valves during the suction or non-pressure-producing return stroke and is delivered in metered flow through an outlet pipe 15 after passage through a pair of outlet ball valves.

The present invention is applicable to controlled volume pumps of widely differing character, such for example as shown in my Patent No. 2,640,425, dated June 2, 1953, or in my Patent No. 2,620,734. While other types of ball valve assemblies may be preferred, the one disclosed in Sheen Patent 2,263,429 or in my copending application Serial No. 471,623, filed November 29, 1954, now U.S. Patent No. 2,898,867, are to be preferred. The controlled volume pump 10 has associated therewith a variable stroke driving mechanism which may be of either of the types illustrated in my foregoing patents. As illustrated, I have included certain of the elements of the stroke-adjusting mechanism of my copending application, Serial No. 578,503, filed April 16, 1956, now United States Patent No. 2,841,991. Thus, a motor 16 through a suitable gear reducer (not shown) drives a crank 17 to reciprocate a drive rod 18 pivotally connected at 19 to a swing member 20 pivotally supported at 21 by a bracket 22 and adjustable along a predetermined path. The supporting structure for guidance of member 22 and of pivot 21 along said path has been omitted for purposes of simplifying the drawing.

With the parts in the position shown, the plunger 12 has just completed a pressure-producing working stroke. As the crank 17 is moved counterclockwise from its illustrated position, the plunger 12 is moved in a right-hand direction as viewed in Fig. 1 to begin the non-pressure-producing return stroke.

Since the pressure within the delivery line 15 may be quite high, it will be understood that as the plunger 12 is moved into the liquid filled plunger chamber on the forward or pressure-producing stroke, a pressure must be developed within the plunger chamber adequate to overcome the pressure within the outlet line 15. The pressure-producing working stroke develops on the plunger and crosshead 11 a reaction force of large magnitude which must be overcome by the thrust developed by the drive rod 18 and which is transmitted thereto through a drive rod 23 carried by the swing member 20.

In order to adjust the length of the stroke, the swing member 20 is bodily moved along its predetermined path of adjustment (as along the position of the axis of element 23 in the position shown in Fig. 1) to change the ratio of the lever arms or kinematic links respectively extending between pivotal connections 21 and 19 and pivotal connections 21 and 24. As explained in my aforesaid Patent No. 2,841,991, the pivotal connection 24 is preferably in the form of a cylindrical member rotatably carried by a bifurcated end of the crosshead 11 and having a cylindrical opening therethrough which proves the bearing support for the drive rod 23.

As the swing member 20 and rod 23 are moved downwardly, the stroke length is shortened. A feature of my aforesaid copending application is that the forward position of plunger 12 remains substantially constant though the stroke length be shortened from full stroke to zero stroke. The change in stroke occurs by varying the rearmost limit of movement without consequential change of the forward position of the plunger 12 or of crosshead 11.

As already explained, it has heretofore been deemed necessary to provide an adjusting means for the stroke-adjusting element or drive rod 23 of a character which will not be displaced upon application thereto of the reaction force developed by the plunger 12. In accordance with the present invention, there is avoided the use of the worm and worm wheel drives and other similar arrangements, and instead the stroke-adjusting means including the rod 23 is unrestrained and freely movable during each non-pressure-producing return stroke. However, for each pressure-producing working stroke, the stroke-adjusting means, including element or rod 23, is rigidly restrained in a fixed position as by an intermittently operated clamping mechanism 30 operable in timed relation with the driving means 16, 17.

In Fig. 1 the clamping mechanism 30 includes two locking members 31 and 32 normally biased by springs 33 and 34 into locking positions with respect to a rod 35 to which the bracket 22 is secured. The clamping members 31 and 32 have openings through which the rod 35 extends and in their clamping or locking position, the edges of the walls of the openings tend to "bite" into the rod 35 to prevent any displacement thereof.

As shown, the clamping or locking members 31, 32 are pivoted as at 36 and have ends forming a triangular recess therebetween to receive a wedge-shaped actuating member 37 which upon entry into said recess spreads the locking members 31 and 32 to release the stroke-adjusting mechnanism, specifically to release the rod 35.

As shown, the member 37 is actuated by a solenoid 38 energized from supply lines 39 and 40 under the control of a switch 41 actuated by a cam 42 and cam follower 43 in timed relation with the operation of the variable stroke driving mechanism. The cam 42 is driven by the motor 16. Assuming counterclockwise rotation of the crank 17, it will be seen that the crest of the cam 42 will engage the cam follower 43 to close the switch 41, to energize the solenoid 38, to actuate the clamping and restraining means 30, to release the rod 35. Thus, as the plunger 12 is moved to the right, the non-pressure-producing return stroke, the rod 35, bracket 22 and stroke-adjusting rod 23 are freely movable, unrestrained in any way, and the length of stroke may be changed as desired. However, after a time interval sufficient to accomplish the stroke adjustment and always prior to the pressure-producing working stroke which supplies a substantial reaction force to the rod 23, the crest of the cam 42 passes by the cam follower 43 for the opening of the switch 41, the deenergization of the solenoid 38, and the actuation by the springs 33 and 34 of the locking and restraining means 30, again rigidly to hold the stroke-adjusting means in fixed position.

Inasmuch as the controlled volume pump 10 delivers to the outlet line 15 a liquid in metered flow, the flow rate may be adjusted by changing the stroke length to suit the changing needs of a particular application. For example, if acidity or alkalinity of a main stream in a line 45 is to be controlled by varying the flow of a reagent in a liquid from inlet line 14 in a predetermined proportion, a measuring device 46 may be provided for producing an electrical output across output conductors 47 whose magnitude and polarity (or phase) represents the change in flow desired in the reagent line 15.

When the flow-ratio of line 15 to line 45 is to be kept constant, a valve 48a is opened and a flow meter 48 in line 15 is effective with an associated flow meter 49 in line 45 for response by the measuring device 46 of an indication of the deviation from a predetermined ratio of the flow of liquids in lines 15 and 45.

In the foregoing applications of the invention, to be taken as suggestive of many additional uses, the electrical output from the sensing device 46 is applied through an amplifier 50 for the energization of a motor 51 having a driving gear 52 meshing with a rack gear 53 for the adjustment of a sensing element 54 by an amount and in a direction related to the desired change of flow in line 15.

The amplifier 50 may be of the type disclosed in either of the United States Letters Patent to Williams, Nos. 2,113,164 or 2,367,746. In the form of the invention shown in Fig. 1, there are secured to the rod 35 thrusters shown as a pair of solenoids 55 and 56 arranged for simultaneous energization under the control of a switch 57 opened and closed by a cam 58 driven by the motor 16. Associated with the sensing element 54 is a clamping and restraining means 59 of like construction to the restraining means 30. The operating solenoid 38a is illustrated energized through a circuit completed by a switch 60 closed by a cam 61 driven by motor 16. Thus, the clamping members 31a and 32a are shown in the released position with the elongated portion of the sensing element 54 free to move between them upon energization of the motor 51.

Assuming now that the flow through the line 15 is to be decreased, it will be understood that the measuring device 46 and amplifier 50 will function to produce energization of the motor 51 for rotation in a direction to move the rack gear 53 downwardly and to move the sensing element 54 nearer the plunger 56a of the solenoid 56. As soon as the crest of the cam 61 passes the cam follower 62, the switch 60 is opened to deenergize solenoid 38a for actuation by the springs 33a and 34a of the restraining means 59 rigidly to hold the sensing element 54 in its new position. Thereafter the crest of the cam 58 through cam follower 63 closes switch 57 to energize the solenoids 55 and 56. The plunger or core 56a of solenoid 56 first engages the sensing element 54 since it has been positioned nearer that plunger than the plunger 55a of the solenoid 55. Since the restraining mechanism 30 has operated to release the rod 35, the solenoid 56 is effective to move the rod 35, the bracket 22 and the stroke-adjusting element 23 downwardly by an amount equal to the initial displacement of the sensing element 54 from its neutral position midway of the ends of the plungers. Thus, energization of solenoids 55 and 56 produces movement of their plungers 55a and 56a toward each other, causing them to engage element 54. This element, being locked in space at that time, produces by action of the solenoid 56 downward movement of member 35 until the element 54 is again centered between the plungers 55a and 56a with both engaging member 54. The resultant change in stroke due to the new position of member 35 is proportional to the sense and extent of displacement of the sensing element 54 from its neutral position, i.e., centered between the solenoids 55 and 56. Instead of solenoids, hydraulically operated elements, as thrusters, may be utilized, and air-actuated plungers likewise can be used.

Since both solenoids 55 and 56 are simultaneously energized, the movement is terminated when the rod 35 has been moved the foregoing distance. At that time the end of the plunger of the solenoid 55 will engage the sensing element 54 to bring member 35 to standstill in its new position. The operation is such that the movement of the stroke-adjusting element is proportional to the deviation of the condition under control from a predetermined value and, of course, is always in the correct direction to tend to return the magnitude of the condition to its predetermined value.

If the deviation is opposite to that previously assumed, then the sensing element 54 is moved nearer the solenoid 55. Accordingly, its plunger is first effective and it moves the rod 35 upwardly by an amount corresponding with the positioning of the sensing element 54 upwardly of its neutral position.

Normally the plungers 55a and 56a may be biased (as by springs) to their retracted positions and they may be provided with T-shaped ends acting as stops to limit the forward movement thereof upon energization of the coils. Instead of being biased to the retracted or outward positions, they may be freely movable within the coils while deenergized, the only restriction being the provision of suitable stops for retaining them within the operating coils ready to be moved to the energized positions to engage the sensing element 54. A further requirement is that when both plungers 55a and 56a have been moved their full distance inwardly and toward the sensing element 54, they will engage, or approximately so, the opposite surfaces of member 54 to center it between them.

In summary, it will be seen that the embodiment of the invention illustrated in Fig. 1 has a stroke-adjusting element 23 which is restrained or clamped in fixed position each time the plunger 12 is moved through its pressure-producing working stroke. While the element 23 and its positioning rod 35 are clamped in fixed position, the measuring device 46 is effective either directly to position element 54 or, as shown, device 46 through amplifier 50 and motor 51 to position the sensing element 54 preparatory to adjustment of the length of stroke to meet the requirements of the process; i.e., a changed flow in line 45. After a short interval of time and prior to the release of the clamping means 30, the restraining means 59 is energized to clamp the sensing device 54 in its new position to await energization of the solenoids 55 and 56. These solenoids comprise the restoring means for adjusting the rod 35 and the stroke-adjusting element 23 to change the stroke of the controlled volume pump 10. That adjustment occurs after release of clamping means 30. Thus, the operations are all in timed relation one to the other and particularly with the variable stroke driving mechanism actuating the plunger 12 for metered flow of liquid through the outlet line 15.

Now that the principles of the invention have been explained, it is to be understood that various arrangements may be utilized to practice the invention. For example, in Fig. 2 the driving motor 16 supplies the power for actuating the restoring means for the stroke-adjusting element. This will be clearly understood as the operation of the mechanical arrangement of Figs. 2–5 is explained.

Figure 2:
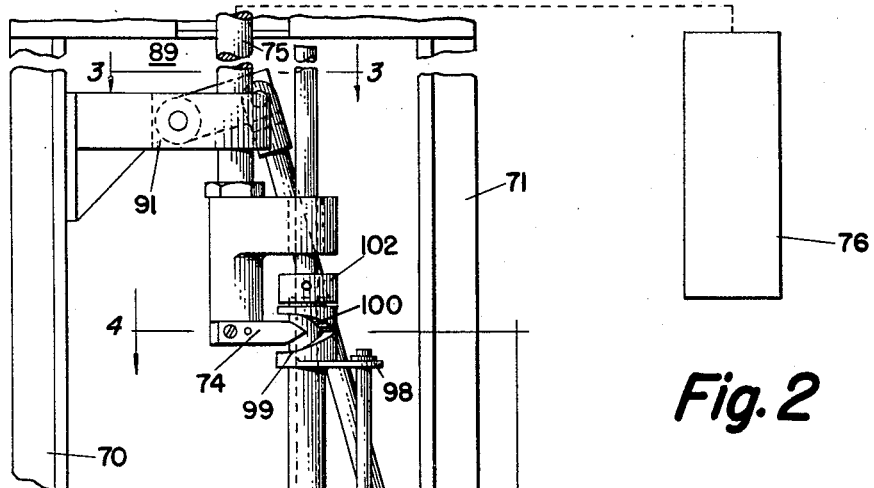
Fig. 2 is a side elevation of a mechanism embodying a modification of the invention.
Figure 2:
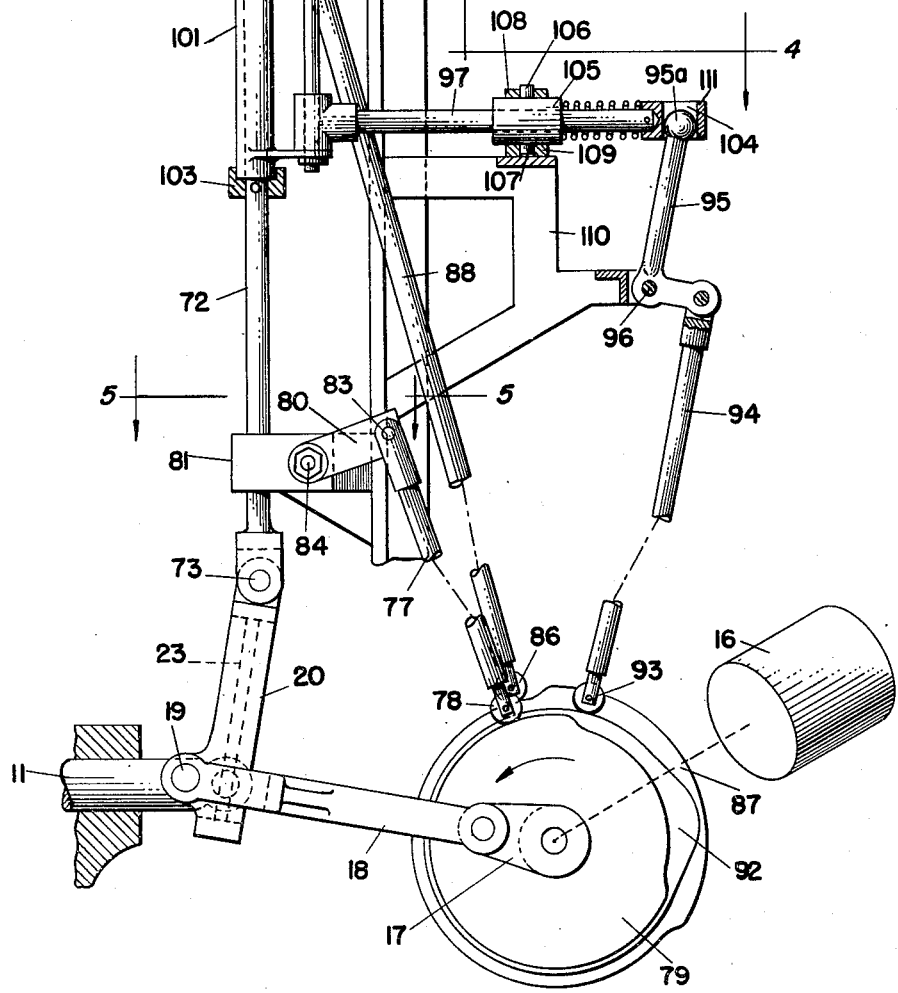
Figure 3:
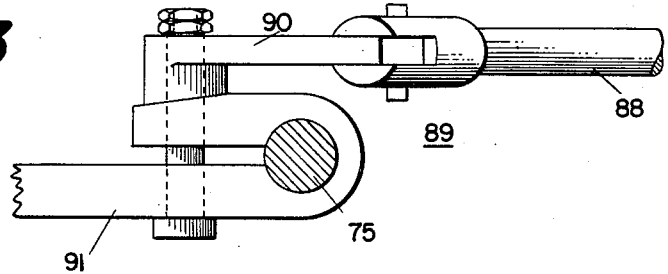
Fig. 3 is a sectional view taken on the line 3—3 of Fig. 2.

In Fig. 2, the crosshead 11 is actuated by the driving rod 18 and the crank 17 with the stroke-adjusting element including the rod 23, as described in connection with Fig. 1. In Fig. 2, the path of adjustment of the element 23 is not inclined as in Fig. 1 though obviously it may be. When that path is vertical, as illustrated in Fig. 2, the forward position of the plunger will not remain substantially constant as in Fig. 1. The stroke adjustment will then take place by changing both the forward and rearward positions of the plunger and crosshead 11.

In the arrangement of Fig. 2, the stroke-adjusting mechanism is supported by a frame including the angle irons 70 and 71. The rod 72 is pivotally connected at 73 to the upper end of the swing member 20. As the rod 72 is moved downwardly from its illustrated position, the length of the stroke of the crosshead 11 is decreased. The downward movement of rod 72 takes place as the result of the raising and lowering of a sensing element 74 as by the movement of a rod 75 by any suitable means 76, such as for example by the rack and gear arrangement illustrated in Fig. 1. In this connection, it is to be understood that the device 76 may include a pneumatic or hydraulic actuator to move the rod 75 in accordance with the deviation in the magnitude of a condition from a predetermined value.

Figure 5:
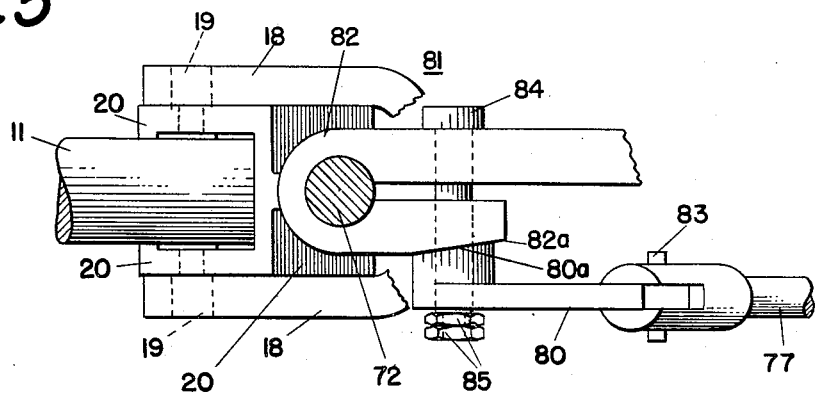
Fig. 5 is a sectional view taken on the line 5—5 of Fig. 2.

The parts in Fig. 2 are in positions corresponding with the near-completion of the pressure-producing working stroke. An actuating rod 77 is shown with its cam follower 78 on the crest of a cam 79 for actuation through the crank arm 80 of a clamping means 81 surrounding the rod 72. This clamping means, as best shown in Fig. 5, comprises a clamping member 82 of U-shape wrapped about the rod 72 and having a cam surface 82a engaged by cam surface 80a of the crank 80. As the actuating rod 77 is moved to its illustrated position, it functions through the pivotal connection 83 to rotate the crank 80 in a counterclockwise direction. The eccentric or inclined cam surfaces 80a and 82a act on the principle of a wedge or inclined plane to press together the arms of the U-shaped member 82 rigidly to clamp therebetween the rod 72. The through bolt 84 serves as an important part of the clamping mechanism. Thus, as the end of the U-shaped member 82, having the surface 82a, is pressed by cam surface 80a toward the head of the through bolt 84, the reaction force is taken by the lock nuts 85. Thus, the inward force on the surface 82a produces a pinching action on the rod 72.

Figure 4:
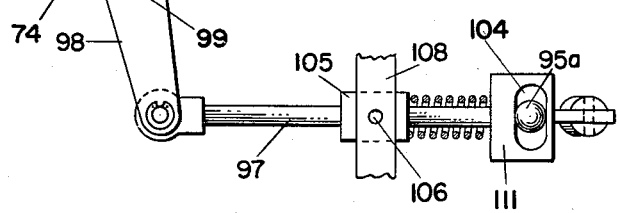
Fig. 4 is a sectional view taken on the line 4—4 of Fig. 2.

As the cam follower 78, Fig. 2, moves to the trough or lower portion of the cam 79, the clamping mechanism 81 is released. It will now be assumed that just prior to the release of the clamping mechanism 80, the adjusting means 76 had moved downwardly both the rod 75 and the sensing element 74. As the crest of a cam 87 is moved beneath the cam follower 86, an actuating rod 88 is moved upwardly to actuate a clamping mechanism 89. The clamping mechanism 89 is quite similar to that illustrated in Fig. 5 and the details thereof are clearly shown in Fig. 3. Upon actuation of rod 88, the crank 90 moves together the ends of the return bend of the clamping element 91 securely to lock in position the rod 75. Thereafter, a cam 92 is moved to a position where its crest engages a cam follower 93 to actuate through a rod 94 and a bell crank 95 pivoted to the frame at 96 a rod 97 to rotate a crank 98. As shown in Figs. 2 and 4, the crank 98 is pivoted about the axis of rod 72. The crank 98 has a V-shaped notch in a hub portion having a pair of cam surfaces 99 and 100. These surfaces are rotated toward the pointed end of the sensing element 74.

If the sensing element 74 has been moved downwardly from the illustrated position, then as the cam surface 99 is moved to the left, it first engages the lower surface of the element 74. Continued movement of surface 99 develops a downward thrust upon it and upon the sleeve 101 secured between thrust bearings 102 and 103 carried by the rod 72. Thus, as the surface 99 is moved to the left, the rod 72 is moved downwardly. It is brought to standstill when the end of element 74 rests against both of the cam surfaces 99 and 100. The maximum possible adjustment of rod 72 for each actuation by the cam 92 is dependent upon the maximum spacing between the cam surfaces 99 and 100. This may be varied as may be desired. It is shown relatively small since stroke adjustment can take place during each unloaded return stroke and thus the stroke length may in a short period of time vary from full stroke to zero stroke and vice versa.

Though other suitable linkage arrangements can be provided, the bell crank 95 is shown as having at one end a ball 95a nesting within a rectangular opening 104 of a bearing member 111 secured to the end of the rod 97. Thus, there is adequate provision for relative movement of the linkage mechanism due to the arcuate travel of the crank 98, that of link 97 about pivot pins 106 and 107, and for the ball 95a upon rotation of the crank 95. The ball 95a may move upwardly and downwardly along the bearing surfaces of member 111 to provide for its change of position due to its rotation about the axis of the pivotal connection 96, and relative movement takes place as the rod 97 is swung about the axis of pivot pins 106 and 107. It will be observed the pivot pins 106 and 107 pivotally mount the bearing member 105 between the members 108 and 109 which are suitably supported from the frame or bracket 110, as appears in Fig. 2.

Now that the principles of the invention have been explained in connection with different modifications, it is to be understood that other modifications may be made within the scope of the appended claims and that the drawings, in general are diagrammatic. Thus in Fig. 1, there has been omitted entirely the frame structure to which the clamping elements 30 and 59, together with the associated solenoids 38 and 38a, will be maintained stationary. In Fig. 2, part of the frame structure has been illustrated and just enough to suggest the manner of support of the parts. Those skilled in the art can readily supply the supporting structure necessary to a selected embodiment of the invention best suited to particular applications.

What is claimed is:

1. A controlled volume pump comprising a plunger to be reciprocated within a plunger chamber, inlet and outlet valve means flow connected with said chamber for displacement of liquid therefrom during a pressure-producing working stroke of said plunger and for admitting liquid to said chamber during a non-pressure-producing return stroke of said plunger, a variable stroke driving mechanism connected to said plunger and including a driving means having a stroke-adjusting element freely movable between minimum and maximum stroke positions, restraining means actuated in timed relation with said driving means for holding said stroke-adjusting element against any stroke-adjusting movement during said pressure-producing working stroke and for releasing said stroke-adjusting element for a stroke-adjusting movement only during said return stroke, and positioning means operable under the control of said driving means and movable into engagement with said element to move that element when released to change the length of said working stroke.

2. The controlled volume pump of claim 1 in which there are provided positioning means having a driving connection with said stroke-adjusting element for moving that element between minimum and maximum stroke positions, a sensing element, means positioning said element from a neutral position in direction and to extent corresponding with the desired change of stroke, clamping means including said restraining means and including a further restraining means for said sensing element, and means for alternately operating said restraining means for holding said sensing element in fixed position when said stroke-adjusting element has been released and for releasing said sensing element when said stroke-adjusting element is held against stroke-adjusting movement.

3. The controlled volume pump of claim 2 in which said positioning means for said stroke-adjusting element includes a pair of thrusters disposed in cooperative relationship with said sensing element for moving said stroke-adjusting element.

4. The controlled volume pump of claim 3 in which said thrusters are solenoids.

5. A system of controlling the flow of fluids comprising a variable volume pump, driving mechanism for said pump including an adjustable element for varying the stroke and thereby the volume of fluid delivered by said pump, said element having imposed thereon a reaction force of higher magnitude during the pressure-producing part of the stroke than during the non-pressure-producing part of the stroke, releasable locking means disposed for movement into and out of engagement with said element, actuating means operable in timed relation with said driving mechanism for operating said locking means into engagement with said element to hold said element stationary during said pressure-producing part of said stroke and for releasing said element from said engagement during the non-pressure-producing part of said stroke, and relay means operable in timed relation with said locking means including power driven means disposed in driving engagement with said element for selectively moving said element to increase and to decrease the length of said stroke only when said locking means has been actuated to release said element, said relay means including a sensing member for regulating the extent and direction of adjustment of said element by said power driven means in accordance with the position of said sensing member from a neutral position, said relay means including a second releasable locking means operable in timed relation with said driving mechanism for holding said sensing member in a fixed position during adjustment of said element by said power driven means.

6. A variable stroke driving mechanism comprising a driven member to be reciprocated, movement thereof in one direction representing a pressure-producing working stroke and movement thereof in the opposite direction representing a non-pressure-producing return stroke, driving means for said driven member including a movable stroke-adjusting element in driving relation with said member, restraining means actuated in timed relation with said driving means for holding said stroke-adjusting element against any stroke-adjusting movement during said working stroke and for releasing said stroke-adjusting element for stroke-adjusting movement only during said return stroke, positioning means for said stroke-adjusting element comprising a sensing element movable from a neutral position in one direction or the other corresponding respectively with a desired increase and a desired decrease in the length of said stroke and by an amount related to the extent of movement of said sensing element from its neutral position, said positioning means having cooperative surfaces movable with said stroke-adjusting element for reestablishing the neutral position of said sensing element after each stroke-adjusting movement of said element, and locking means engaging and disengaging said sensing element in timed relation with said driving means for restraining it in fixed position after release of said adjusting element by its restraining means for movement thereof to a new stroke-adjusting position.

7. The variable stroke mechanism of claim 6 in which said positioning means includes a cam operated linkage operable by said driving means for positioning said stroke-adjusting element.

8. The variable stroke mechanism of claim 6 in which said cooperative surfaces carried by said stroke-adjusting element comprise the operating surfaces of the plungers of a pair of solenoids energized in timed relation with said driving means.

9. In a variable stroke driving mechanism having a driven member to be reciprocated, driving means therefor including a stroke-adjusting element in driving connection with said member movable between predetermined limits for varying the stroke length, the combination of a positioning means for said stroke-adjusting element having structure movable cyclically into and out of locking engagement with said stroke-adjusting element, a sensing element movable in direction and to an extent from a neutral position corresponding with the direction and extent of movement desired of said stroke-adjusting element, locking means having structure operable in timed relation with said positioning means for engaging said sensing element to hold it in fixed position when said adjusting element is released and for releasing said sensing element when said adjusting element is locked in position, actuating means carried by said adjusting element and disposed to engage said sensing element for developing a force on said adjusting element tending to move it in one stroke-adjusting direction or the other, and means operable in timed relation with said driving means for operating said actuating means during the time said stroke-adjusting element is released for displacing that element in a direction to restablish the neutral position of said sensing element.

10. The mechanism of claim 9 in which said actuating means comprises opposed thrusters carried by said stroke-adjusting element for repositioning that element in its neutral position in response to displacement of said sensing element from its neutral position.

11. The mechanism of claim 9 in which said stroke-adjusting element has a pair of opposed inclined surfaces and in which said sensing element is disposed between said opposed inclined surfaces, said sensing element having a surface which when engaged by one or the other of said first-named surfaces displaces said stroke-adjusting element in the direction in which said sensing element has departed from its neutral position.

12. A variable-stroke driving mechanism comprising a driven member movable under load in a forward direction corresponding with a working stroke and in a reverse direction corresponding with an unloaded return stroke, driving means including a stroke-adjusting element connected to said driven member for moving said member through its working stroke and adjustable between minimum and maximum stroke positions, said movement of said member under load developing reaction forces in directions tending to displace said stroke-adjusting element, and restraining means actuated in timed relation with said driving means and into and out of clamping engagement with said stroke-adjusting element for holding that element against displacement during each said working stroke and for releasing said stroke-adjusting element during recurring return strokes, whereby it may be adjusted only during return-stroke movements of said driven member.

13. A variable-stroke driving mechanism comprising a driven member movable under load in a forward direction corresponding with a working stroke and in a reverse direction corresponding with an unloaded return stroke, driving means including a movable stroke-adjusting element connected to said driven member for moving said member through its working stroke, said movement of said member under load developing reaction forces in directions tending to displace said stroke-adjusting element, restraining means actuated in timed relation with said driving means and into and out of clamping engagement with said stroke-adjusting element for holding that element against displacement during each said working stroke and for releasing said stroke-adjusting element during recurring return strokes, and stroke-adjusting means disposed for engagement with said stroke-adjusting element for adjusting said element only during the unloaded return-stroke movements of said driven member.

14. A variable stroke driving mechanism comprising a driven member to be reciprocated, movement thereof in one direction representing a working stroke which applies to said member a reaction force of substantial magnitude, movement of said member in the opposite direction representing a return stroke during which said reaction force on said member substantially entirely disappears, driving means, a stroke-adjusting element interconnecting said driving means and said driven member and movable between minimum and maximum stroke positions for varying the stroke length, said element due to its said interconnection having applied thereto at least a part of said reaction force, positioning means disposed in driving relationship with said stroke-adjusting element for moving it from one position to another to change said stroke length, holding structure movable relative to said stroke-adjusting element between a holding position and a releasing position for said element, and means operable in timed relation with said driving means first actuating said holding structure to said holding position, in which position said structure engages said stroke-adjusting element to prevent movement of that element during said working stroke both by said reaction force and by said positioning means and for then actuating said holding structure to move it to said releasing position to free said element for movement by said positioning means in the range between its minimum and maximum stroke positions during said return stroke.

15. The variable stroke driving mechanism of claim 14 in which said positioning means has a sensing element displaceable in direction and by an amount from a neutral position corresponding with a desired change in length of stroke during the time said restraining means is holding said stroke-adjusting element against movement, and driving means for said stroke-adjusting element operable under the control of said sensing element for moving said stroke-adjusting element when said holding structure is in its releasing position in direction and by an amount proportional to said displacement of said sensing element.

16. A variable stroke driving mechanism comprising a driven member to be reciprocated, driving means, a stroke-adjusting element interconnecting said driving means and said driven member and movable between minimum and maximum stroke positions for varying the stroke length, a sensing element, means connected to said sensing element to move it from a neutral position independently of movement of said stroke-adjusting element in direction and by an amount proportional to the desired change in position of said stroke-adjusting element, and driving means having a driving connection with said stroke-adjusting element having structure disposed in cooperative relation with said sensing element for moving said stroke-adjusting element in one direction upon displacement of said sensing element in one direction from a neutral position and for moving said stroke-adjusting element in the opposite direction upon displacement of said sensing element in the opposite direction from said neutral position and by amounts proportional to the displacement of said sensing element from its said neutral position, clamping means operatively associated with said stroke-adjusting element and said sensing element, and means having driving connections with said clamping means cyclically to operate that means for clamping said stroke-adjusting element in fixed position during said displacement of said sensing element and for thereafter releasing said stroke-adjusting element and for clamping said sensing element during movement of said stroke-adjusting element to change the length of stroke of said driven member.

References Cited in the file of this patent

UNITED STATES PATENTS

| | | |
|---|---|---|
| 1,203,259 | Pogue | Oct. 31, 1916 |
| 1,522,277 | Sauvage | Jan. 6, 1925 |
| 1,956,923 | Jendrassik | May 1, 1934 |
| 2,084,662 | Williamson | June 22, 1937 |
| 2,105,093 | Noble | Jan. 11, 1938 |
| 2,435,711 | Crofton | Feb. 10, 1948 |
| 2,538,619 | Friedman | Jan. 16, 1951 |
| 2,548,738 | Orlich et al. | Apr. 10, 1951 |
| 2,587,395 | Sheen | Feb. 26, 1952 |
| 2,692,510 | Gille | Oct. 26, 1954 |